(12) United States Patent
Reed

(10) Patent No.: US 6,671,739 B1
(45) Date of Patent: Dec. 30, 2003

(54) CONTROLLING NETWORK ACCESS BY MODIFYING PACKET HEADERS AT A LOCAL HUB

(75) Inventor: Benjamin C. Reed, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 714 days.

(21) Appl. No.: 09/613,566

(22) Filed: Jul. 10, 2000

(51) Int. Cl.[7] ................................................ G06F 15/16
(52) U.S. Cl. ........................ 709/246; 709/232; 709/238; 370/401; 370/392
(58) Field of Search ................................ 709/232, 236, 709/238, 244, 246, 249, 250; 370/245, 256, 400, 401, 474, 380, 395.53

(56) References Cited

U.S. PATENT DOCUMENTS

| | | | |
|---|---|---|---|
| 5,327,127 A | * 7/1994 | May et al. | 341/102 |
| 5,426,427 A | 6/1995 | Chinnock et al. | |
| 5,483,522 A | * 1/1996 | Derby et al. | 370/400 |
| 5,577,202 A | 11/1996 | Padgett | |
| 5,610,905 A | * 3/1997 | Murthy et al. | 370/401 |
| 5,740,375 A | * 4/1998 | Dunne et al. | 709/238 |
| 5,764,914 A | 6/1998 | Goto et al. | |
| 5,861,883 A | 1/1999 | Cuomo et al. | |
| 5,892,912 A | * 4/1999 | Suzuki et al. | 370/395.53 |
| 5,987,521 A | 11/1999 | Arrowood et al. | |
| 6,006,090 A | 12/1999 | Coleman et al. | |
| 6,014,380 A | * 1/2000 | Hendel et al. | 370/392 |
| 6,038,608 A | * 3/2000 | Katsumata | 709/238 |
| 6,041,042 A | * 3/2000 | Bussiere | 370/245 |
| 6,081,512 A | * 6/2000 | Muller et al. | 370/256 |
| 6,172,990 B1 | * 1/2001 | Deb et al. | 370/474 |
| 6,175,875 B1 | * 1/2001 | Stapleton et al. | 709/250 |
| 6,385,197 B1 | * 5/2002 | Sugihara | 370/380 |
| 6,425,015 B1 | * 7/2002 | Jennings et al. | 709/238 |

OTHER PUBLICATIONS

US 5,909,554, 6/1999, Iturralde (withdrawn)

* cited by examiner

*Primary Examiner*—Wen-Tai Lin
(74) *Attorney, Agent, or Firm*—McGinn & Gibb, PLLC; Khanh Q. Tran, Esq.

(57) ABSTRACT

A method and structure for processing packets of information over a data processing system is disclosed. The packets have header information indicating a source and a destination of the packets. The method includes receiving a packet from a client, forwarding the packet to a hub of a local area network, changing the header of the packet such that the packet is directed to a server instead of an original destination, processing the packet through the server to produce a processed packet, and forwarding the processed packet to the original destination.

27 Claims, 2 Drawing Sheets

US 6,671,739 B1

CONTROLLING NETWORK ACCESS BY MODIFYING PACKET HEADERS AT A LOCAL HUB

BACKGROUND OF THE INVENTION

1. Field of the Invention

The present invention generally relates to protecting computers and more particularly to controlling network access by modifying packet headers.

2. Description of the Related Art

When devices are attached to a network, the devices must be correctly configured to work properly. Malicious or accidental misconfiguration of devices may result in loss of service to the device itself or other devices on the network. In public LANs (local area networks) such as those found at conferences, exhibitions, media rooms, etc., the network administrators are faced with the task of ensuring the devices connected to the LAN behave properly.

For example, with conventional LANs, each client connected to a hub must have a unique hardware and network address. If users connecting to a hub inadvertently have the same address, the conflicting addresses will prevent the LAN and hub from processing communications correctly. It is becoming more common for convention centers and trade shows to allow individuals operating their own personal computers to connect to a hub of a LAN for the purpose of retrieving information from the LAN or connecting to another network such as the Internet. However, such random connections by unidentified pieces of hardware can readily create address conflicts.

Generally, administrators ensure proper LAN operation by detecting and fixing errors as they occur on the LAN. If the error was maliciously created, the problem may be hard to detect. In any case, with conventional systems, the problem must be handled manually.

If more sophisticated LAN equipment is used, each port on the LAN can be partitioned from all the other ports to better isolate problems. If enough computing power is present at the ports, many misconfigurations and problems can be dealt with and corrected by the individual ports. If each port is connected directly to a server, clients won't be able to interfere with each others' traffic and the server can correct any errors before forwarding the packet on to its destination. However this means that a non-shared line must be run from every client to the server. This increases the cost per client because of the wiring cost as well as the cost at the server since the server must have a port for each client and greatly increases the cost of the LAN. Therefore, there is a need to be able to process and modify network packets without substantially increasing the costs per port of the LAN.

SUMMARY OF THE INVENTION

It is, therefore, an object of the present invention to provide a structure and method for controlling network access without extensive hardware enhancements by modifying packet headers. More specifically, the invention includes a method of processing packets of information over a data processing system. The packets have header information indicating a source and a destination of the packets. The method includes receiving a packet from a client, forwarding the packet to a hub of a local area network, changing the hardware level header of the packet such that the packet is directed to a server instead of an original destination, processing the packet through the server to produce a processed packet, and forwarding the processed packet to the original destination.

With the invention, the hub only allows packets from the server to be delivered to the client. Further, the processing screens the packet for proper access rights and changes the packets to correct errors within the packets. Also, the server processes the packet to prevent damage or unauthorized access to the original destination. The server further modifies the header to eliminate conflicting addresses of clients connected to the hub. All hubs connected to the local area network modify headers of packets being processed such that all packets being transmitted by the clients connected to the hubs are processed through the server.

In another embodiment, the invention comprises a data processing network that includes at least one server, at least one local area network connected to the server, at least one hub connected to the local area network, and at least one client connected to the hub. The client transmits packets to the hub. The packets have header information indicating a source and a destination of the packets. The hub changes the header of the packet such that the packet is directed to the server instead of an original destination. The server processes the packet and forwards the packet to the original destination.

In a further embodiment, the invention comprises a hub for a data processing network having at least one server. The hub includes a first connected to the server, a second connection to at least one client, and an addressing unit operatively connected to the first connection and the second connection and in communication with the server. The client transmits packets to the second connection, the packets have header information indicating a source and a destination of the packets, the addressing unit changes the header of the packet such that the packet is directed to the server instead of an original destination, and the server processes the packet and forwards the packet to the original destination based on information from the addressing unit.

The addressing unit only allows packets from the server to be delivered to the client. Further, the addressing unit supplies the server information to screen the packet for proper access rights, to change the packets to correct errors within the packets, to process the packet to prevent damage or unauthorized access to the original destination, and to modify the header to eliminate conflicting addresses of clients connected to the hub.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF PREFERRED EMBODIMENTS OF THE INVENTION

The basis of all communication on a LAN is the addresses of network nodes. Such communications are generally sent from one location on the network to another in "packets" of data. The destination address of a packet is at a fixed location at the head of the packet. The invention solves the problem of restricting access and correcting errors on a LAN (that was discussed above) by ensuring that all packets generated by a port (client) are sent to a server that actually does the packet processing. With the invention many inexpensive LAN hubs can be deployed, which keeps the per port cost down. Further, with the invention, in one embodiment only one server is used for packet processing, which also centralizes the protection schemes necessary and further reduces costs. Such inexpensive LAN hubs modify the packet headers to make all packets go to the packet processing server regardless of their original destination.

The invention is distinct from conventional router mechanisms that are commonly part of conventional LANs. More specifically, conventional routers assume that each client has a distinct address and a properly configured address. In addition, the router cannot prevent clients on the same LAN segment from interfering with and intercepting traffic from other clients. The router assigns distinct addresses to each client connected to the different hubs of a LAN. However, these restrictions substantially reduces the ability of temporary clients to connect to a hub because temporary clients may not have a unique address, the correct address, or may maliciously try to sabotage the network. As discussed above, it is becoming more popular to allow temporary users (e.g., temporary clients) to attach to hubs of LANs at trade shows, conventions, etc. Once again, if different clients on a LAN have conflicting addresses or misconfigured addresses, the system will not operate properly.

Figure 1A:
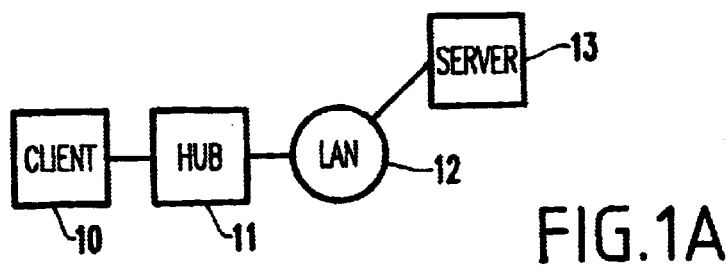
FIG. 1A and 1B are schematic diagrams of a local area network.

As shown in FIG. 1A, a hub 11 of a LAN 12, or a small device 14 that sits between the client 10 and the hub 11, tracks the bits of the packet as they are transmitted by the client 10. When the bits for the destination address are transmitted, the invention substitutes the bits representing the address of the server 13 for the original hardware destination. Thus, the invention replaces the address in the packet header. The invention maintains the original address using conventional protocols.

With the invention, all packets that flow over the network are routed to the server 13. The server 13 checks the packets to ensure that they are valid and fixes them if necessary. Then, so long as the packets have valid access rights and are not malicious or destructive, the server 13 forwards the packets to the original destination. The server knows which addresses are valid using normal network configuration rules. For example, the server knows which addresses are on the local network and which are remote. If an address is received from a local client that its not a valid address, it must be fixed. If the same address is used by multiple clients, it also must be fixed. The addresses are fixed by the server by using a valid address as the source of the packet and translating the address whenever it is used to respond to a message. Such a translation technique is commonly known and is, for example, used by network firewalls.

Figure 1B:
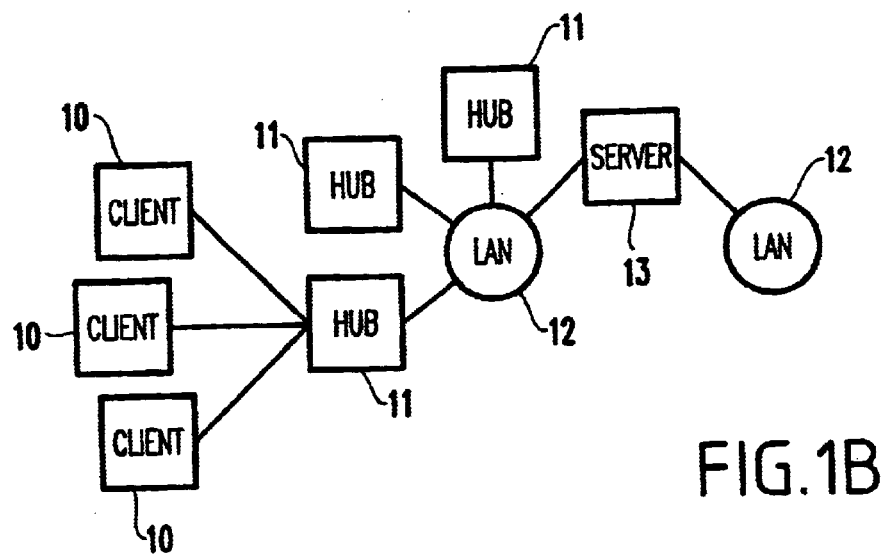

While FIG. 1A illustrates only a single client 10, single hub 11, and single LAN 12 for clarity, as would be known by one ordinarily skilled in the art given this disclosure, multiple clients 10 are generally connected to each hub 11, as shown in FIG. 1B. Further, multiple hub's 11 are generally connected to each LAN 12. Also, multiple LANs 12 may be connected to one another depending upon the specific requirements of the network.

With the invention, each hub 11 can also filter incoming packets to ensure that only packets from the server 13 are directed to the client 10. Packets being routed from one hub directly to a different hub, would be an indication of a corrupt or error prone packet. With the invention, the hub would not allow such a packet to be forwarded to a client and, instead would forward the packet to the server 13 for further processing/error correction.

Figure 2:
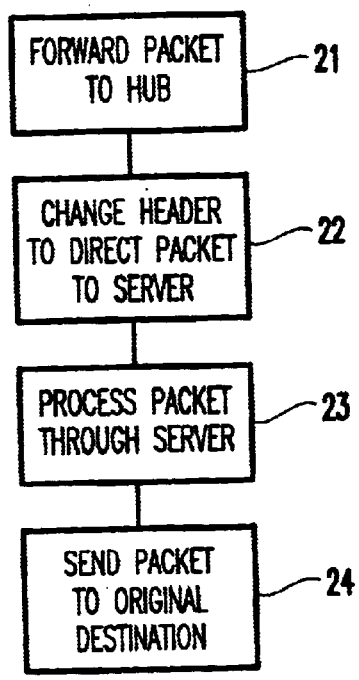
FIG. 2 is a flow diagram illustrating a preferred method of the invention.

FIG. 2 is a flowchart illustration of this embodiment of the invention. The invention first receives a packet from a client 10. The packet is forwarded to the hub 11. (The packet is received from the client 10 by the hub 11.) Then, in item 22, the hub 11 (or other auxiliary device) changes the header of the packet to direct the packet to the server 13. As shown in item 23, the server 13 then processes the packet. Finally, in item 24, the server 13 sends the packet to the original destination.

Figure 3:
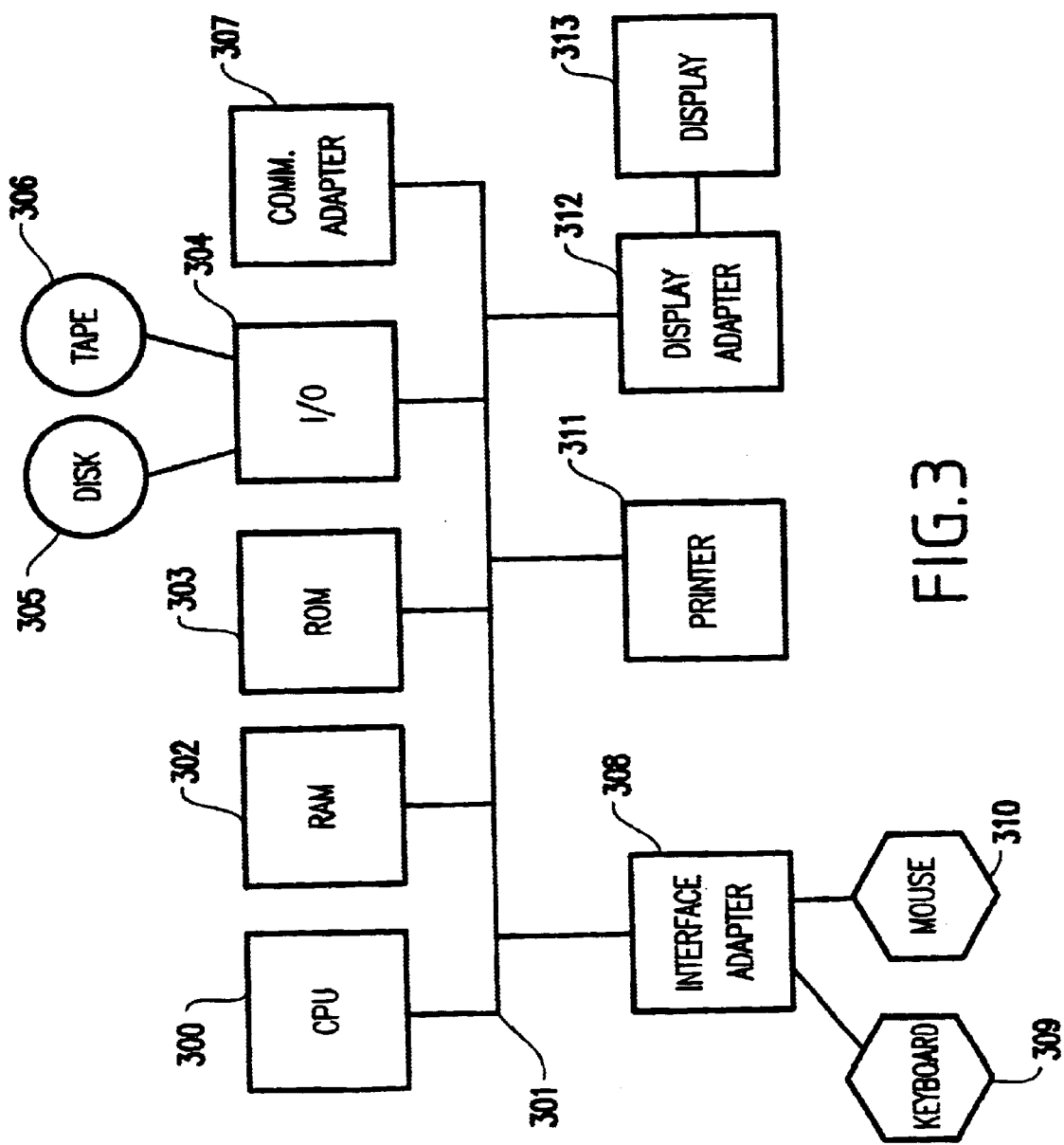
FIG. 3 is a hardware embodiment of the invention.

While the overall methodology of the invention is described above, the invention can be embodied in any number of different types of systems and executed in any number of different ways, as would be known by one ordinarily skilled in the art. For example, as illustrated in FIG. 3, a typical hardware configuration of an information handling/computer system in accordance with the invention preferably has at least one processor or central processing unit (CPU) 300 (such as the server 13 or hub 11 discussed above). For example, the central processing unit 300 could include various addressing units, classification units, clustering units, packet processing units, filters, adders, subtractors, comparators, etc. Alternatively, as would be known by one ordinarily skilled in the art given this disclosure, multiple specialized CPU's (or other similar individual functional units) could perform the same processing, addressing, classifying, clustering, filtering, adding, subtracting, comparing, etc.

The CPU 300 is interconnected via a system bus 301 to a random access memory (RAM) 302, read-only memory (ROM) 303, input/output (I/O) adapter 304 (for connecting peripheral devices such as disk units 305 and tape drives 306 to the bus 301), communication adapter 307 (for connecting an information handling system to a data processing network) user interface adapter 308 (for connecting peripherals 309–310 such as a keyboard, mouse, imager, microphone, speaker and/or other interface device to the bus 301), a printer 311, and display adapter 312 (for connecting the bus 301 to a display device 313). The invention could be implemented using the structure shown in FIG. 3 by including the inventive method, described above, within a computer program stored on the storage device 305. Such a computer program would act on the packets supplied through the interface units 309–310 or through the network connection 307. The system would then automatically control the packet header addressing and output the same on the display 313, through the printer 311 or preferably back to the network 307.

With the invention, the server 13 can create fake higher level headers on the packets received to ensure a consistent mapping between machine and address. For example, an ethernet interface on the server may require that each address has a valid IP (internet protocol) address associated with it. To satisfy this, the invention could rewrite the IP header with the valid address before passing the packet into the normal IP stack of the server (when fixing an address).

Further, as would be known by one ordinarily skilled in the art given this disclosure, the server 13 could be a router to a WAN (wide area network), such as the Internet. Normal NAT (Network Address Translation) can be used to access the WAN, because the invention only modifies traffic between client 10 and server 13. Even a misconfigured client could communicate with the WAN because the server 13 fixes the packets being transferred.

Also, clients 10 on the LAN 12 could communicate with each other on the LAN 12 itself by using the NAT method described in the previous paragraph. As mentioned above, with the invention, packets between two clients would actually go through the server 13. In this way even completely misconfigured clients would still be able to communicate with each other.

The invention enhances security by having the hub 11 rewrite the source address of the packet with a well known address assigned to the port to which the client is connected on the hub (e.g., the hub's address) when packets get transmitted. The server 13 keeps track of the original destination address, so that the address is fixed when the packets are received by the hub. With the invention, an attacker would be unable to change his address to that of another client to confuse the server because the hub overwrites any changes before the packet is actually transmitted from the hub. Further, since the hub only passes messages to the server (and not to other hubs), each client cannot see other traffic, even if the client's NIC (Network Interface Card) was put into promiscuous mode.

The invention prevents malicious clients from interfering with or intercepting other clients traffic. Further, the server can serve as a firewall and prevent unauthorized local and remote traffic from reaching a client. Also, with the invention, misconfigurations at a client can be corrected transparently at the server.

While the invention has been described in terms of preferred embodiments, those skilled in the art will recognize that the invention can be practiced with modification within the spirit and scope of the appended claims.

What is claimed is:

1. A data processing network comprising:
   at least one server; and
   at least one hub connected to said server for allowing at least one client connected to said server, wherein:
   said client transmits packets to said hub;
   said packets have header information indicating a source and a destination of said packets;
   said hub changes said header of said packet such that said packet is directed to said server instead of an original destination; and
   said server processes said packet and forwards said packet to said original destination.

2. The data processing network in claim 1, wherein said hub only allows packets from said server to be delivered to said client.

3. The data processing network in claim 1, wherein said server screens said packet for proper access rights.

4. The data processing network in claim 1, wherein said server changes said packets to correct errors within said packets.

5. The data processing network in claim 1, wherein said server processes said packet to prevent damage or unauthorized access to said original destination.

6. The data processing network in claim 1, wherein said server further modifies said header to eliminate conflicting addresses of clients connected to said hub.

7. The data processing network in claim 1, wherein all hubs connected to said server modify headers of packets being processed such that all packets being transmitted by said clients connected to said hubs are processed through said server.

8. A hub for a data processing network having at least one server, said hub comprising:
   a first connected to said server;
   a second connection to at least one client; and
   an addressing unit operatively connected to said first connection and said second connection and in communication with said server, wherein:
   said client transmits packets to said second connection;
   said packets have header information indicating a source and a destination of said packets;
   said addressing unit changes said header of said packet such that said packet is directed to said server instead of an original destination; and
   said server processes said packet and forwards said packet to said original destination based on information from said addressing unit.

9. The hub in claim 8, wherein said addressing unit only allows packets from said server to be delivered to said client.

10. The hub in claim 8, wherein said addressing unit supplies said server information to screen said packet for proper access rights.

11. The hub in claim 8, wherein said addressing unit supplies said server information to change said packets to correct errors within said packets.

12. The hub in claim 8, wherein said addressing unit supplies said server information to process said packet to prevent damage or unauthorized access to said original destination.

13. The hub in claim 8, wherein said addressing unit supplies said server information to modify said header to eliminate conflicting addresses of clients connected to said hub.

14. A method of processing packets of information over a data processing system, said packets having header information indicating a source and a destination of said packets, said method comprising:
   receiving a packet from a client;
   forwarding a packet from a client to a hub of a local area network;
   changing said header of said packet such that said packet is directed to a server instead of an original destination;
   processing said packet through said server to produce a processed packet; and
   forwarding said processed packet to said original destination.

15. The method in claim 14, wherein said hub only allows packets from said server to be delivered to said client.

16. The method in claim 14, wherein said processing screens said packet for proper access rights.

17. The method in claim 14, wherein said processing changes said packets to correct errors within said packets.

18. The method in claim 14, wherein said server processes said packet to prevent damage or unauthorized access to said original destination.

19. The method in claim 14, wherein said server further modifies said header to eliminate conflicting addresses of clients connected to said hub.

20. The method in claim 14, wherein all hubs connected to said local area network modify headers of packets being processed such that all packets being transmitted by said clients connected to said hubs are processed through said server.

21. A program storage device readable by machine, tangibly embodying a program of instructions executable by the machine to perform a method of processing packets of information over a data processing system, said packets having header information indicating a source and a destination of said packets, said method comprising:
   receiving a packet from a client;
   forwarding a packet from a client to a hub of a local area network;
   changing said header of said packet such that said packet is directed to a server instead of an original destination;
   processing said packet through said server to produce a processed packet;
   forwarding said processed packet to said original destination.

22. The program storage device in claim 21, wherein said hub only allows packets from said server to be delivered to said client.

23. The program storage device in claim 21, wherein said processing screens said packet for proper access rights.

24. The program storage device in claim 21, wherein said processing changes said packets to correct errors within said packets.

25. The program storage device in claim 21, wherein said server processes said packet to prevent damage or unauthorized access to said original destination.

26. The program storage device in claim 21, wherein said server further modifies said header to eliminate conflicting addresses of clients connected to said hub.

27. The program storage device in claim 21, wherein all hubs connected to said local area network modify headers of packets being processed such that all packets being transmitted by said clients connected to said hubs are processed through said server.

* * * * *